United States Patent
Miller et al.

(10) Patent No.: US 10,108,863 B2
(45) Date of Patent: Oct. 23, 2018

(54) SYSTEM AND METHOD FOR DETECTING AND TRACKING OBJECTS

(71) Applicant: Miovision Technologies Incorporated, Kitchener (CA)

(72) Inventors: Nicholas Miller, Kitchener (CA); Akshaya K. Mishra, Kitchener (CA); Justin A. Eichel, Waterloo (CA)

(73) Assignee: Miovision Technologies Incorporated, Kitchener (CA)

( * ) Notice: Subject to any disclaimer, the term of this patent is extended or adjusted under 35 U.S.C. 154(b) by 39 days.

(21) Appl. No.: 15/255,326

(22) Filed: Sep. 2, 2016

(65) Prior Publication Data

US 2017/0068861 A1 Mar. 9, 2017

Related U.S. Application Data (60) Provisional application No. 62/213,817, filed on Sep. 3, 2015.

(51) Int. Cl.
*G06K 9/00* (2006.01)
*G06K 9/48* (2006.01)
(Continued)

(52) U.S. Cl.
CPC ..... *G06K 9/00785* (2013.01); *G06K 9/00771* (2013.01); *G06K 9/481* (2013.01);
(Continued)

(58) Field of Classification Search
None
See application file for complete search history.

(56) References Cited

U.S. PATENT DOCUMENTS

| | | | |
|---|---|---|---|
| 6,470,262 B2 | 10/2002 | Kerner et al. | |
| 6,973,319 B2 | 12/2005 | Ormson | |

(Continued)

FOREIGN PATENT DOCUMENTS

| | | | |
|---|---|---|---|
| CN | 202584420 U | 12/2012 | |
| CN | 103150901 A | 6/2013 | |

(Continued)

OTHER PUBLICATIONS

Miller et al., "A Hidden Markov Model for Vehicle Detection and Counting," 12th Conference on Computer and Robot Vision (CRV), Jun. 2015, pp. 269-276.

(Continued)

*Primary Examiner* — Atiba O Fitzpatrick
(74) *Attorney, Agent, or Firm* — Eversheds Sutherland (US) LLP (57) ABSTRACT

A system and method are provided for mapping spatial and temporal measurements of motion constrained objects in a scene, e.g., vehicles. The method comprises determining a location parameter, and/or other interesting properties, for each of a plurality of objects at a plurality of points over time; generating a vector field over location and time using the location parameters, to specify the motion of each object over time; deriving measurements for each object using velocities from the vector field for that object, as the object moves through the scene over time; and outputting both individual and aggregate object and object property flow for the plurality of objects. Combining the generated map with a network graph and/or network model can provide network flow insights useful for historic event analysis, network flow monitoring, and planning purposes.

28 Claims, 9 Drawing Sheets

(51) Int. Cl.
    *G06K 9/62*     (2006.01)
    *G06T 7/00*     (2017.01)
    *G06T 7/20*     (2017.01)
    *G06K 9/32*     (2006.01)

(52) U.S. Cl.
    CPC .............. *G06K 9/623* (2013.01); *G06T 7/004* (2013.01); *G06T 7/0024* (2013.01); *G06T 7/0034* (2013.01); *G06T 7/2033* (2013.01); *G06T 7/2093* (2013.01); *G06K 2009/3291* (2013.01); *G06T 2207/10016* (2013.01); *G06T 2207/20081* (2013.01); *G06T 2207/30252* (2013.01)

(56) References Cited

U.S. PATENT DOCUMENTS

| | | | |
|---|---|---|---|
| 7,912,628 | B2 | 3/2011 | Chapman et al. |
| 8,666,643 | B2 | 3/2014 | McBride et al. |
| 2014/0016829 | A1* | 1/2014 | Chen .................. G06T 7/20 382/107 |
| 2014/0071286 | A1* | 3/2014 | Bernal .................. G06T 7/20 348/149 |

FOREIGN PATENT DOCUMENTS

| | | |
|---|---|---|
| CN | 103593978 | 2/2014 |
| CN | 103617731 A | 3/2014 |
| DE | 10110326 | 9/2002 |
| EP | 2590151 A1 | 5/2013 |
| WO | 03/046859 A1 | 6/2003 |
| WO | 2008/021551 A2 | 2/2008 |
| WO | 2012/019246 A1 | 2/2012 |

OTHER PUBLICATIONS

Nelson et al., "Vector Field Path Following for Small Unmanned Aerial Vehicles," Proceedings of the American Control Conference, pp. 5788-5794, Jun. 2006, Minneapolis, Minnesota.

Sattarov et al., "Context-based vector fields for multi-object tracking in application to road traffic," IEEE International Conference on Intelligent Transportation Systems (ITSC), Oct. 2014, Qingdao, China, pp. 1179-1185. doi: 10.1109/ITSC.2014.6957847.

International Search Report for corresponding PCT Application No. PCT/CA2016/051045, dated Dec. 7, 2016.

\* cited by examiner

SYSTEM AND METHOD FOR DETECTING AND TRACKING OBJECTS

CROSS-REFERENCE TO RELATED APPLICATIONS

This application claims priority to U.S. Provisional Patent Application No. 62/213,817 filed on Sep. 3, 2015, the contents of which are incorporated herein by reference.

TECHNICAL FIELD

The following relates to systems and methods for detecting and tracking objects.

DESCRIPTION OF THE RELATED ART

Collecting reliable traffic data is important for traffic engineering operations such as designing, upgrading, and maintaining road traffic infrastructure. Real-time traffic data is important for running intelligent transportation systems. Video imaging vehicle detection systems (VIVDS) are now common in the traffic industry and video analytics have become an important technique for obtaining automated vehicle traffic information. Estimating the flow of traffic by counting the number of vehicles that pass through an intersection or piece of roadway during fixed period of time is an important part of traffic operations and intelligent transportation systems.

Existing VIVDS principally employ background subtraction techniques to detect and track vehicles. Models of the static image background scene are built and vehicles are detected as moving objects which are different from the static background. Vehicle presence detection is performed by detecting vehicle-like foreground blobs, and the blobs are segmented and tracked to count the vehicle volumes passing through the scene. Background subtraction can break down due to variations in background appearance, which can be caused by shadows, lighting, weather, road conditions, etc. Camera motion and shaking can also give incorrect background subtraction results. Furthermore counting vehicle volumes is made difficult since perfect long term vehicle tracks are required despite the presence of occlusions, mutual occlusions, and stop and go traffic movement.

Virtual detection lines have also been employed in obtaining vehicle counts. The Virtual Detection Line approach is to specify a single line perpendicular to the direction of travel of vehicles and then generate a Time-Spatial Image (TSI) from the video. Each vehicle crosses this line exactly once so the number of vehicle crossings should be equal to the desired vehicle volume. Vehicle pixels in the video contribute to image artifacts on the TSI resembling the original vehicle with a length inversely proportional to the speed of vehicle as it crosses the virtual detection line. The weakness of this method stems from its sensitivity to the location of the vehicle detection line. Vehicles which are close together as they cross the line are difficult to automatically distinguish in the TSI. For this reason, the approach does not generally extend to multiple lanes of vehicle movement from arbitrary camera angles (particularly lower camera angles). The vehicle segmentation step may also be prone to errors from moving vehicle shadows crossing the line. Camera motion and shakes cause distortions in the TSI thus decreasing the reliability of such features for counting. Additional distortion can also be caused by ordinary speed variations and stop and go vehicle movement. Averaging from Multiple Virtual Detection Lines has been attempted, but does not address camera motion and failures of background subtraction.

Long term tracking is an approach that attempts to completely identify single vehicles as they traverse the entire scene. This approach is typically used in people tracking where individual people are tracked as they move around in a video scene. Long term tracking is typically found to be very sensitive and error prone when the identities of tracked objects are not properly maintained. Previous approaches include short term tracking with a post processing step to stitch tracks together to form reasonable long term tracks, but this approach is still sensitive to identity association.

SUMMARY

In one aspect, there is provided a method of mapping movement of objects in a scene, the method comprising: determining, by a processor, a location parameter for each of a plurality of objects at a plurality of points in time; generating a vector field over location and time using the location parameters, to specify, for each object, motion of that object over time; generating a motion path for each object using velocities from the vector field for that object, as the object moves through the scene over time; and outputting a mapping of the motion paths for the plurality of objects.

In another aspect, there is provided a computer readable medium comprising computer executable instructions for performing the above method.

In yet another aspect, there is provided a system comprising a processor and memory, the memory comprising computer executable instructions for performing the above method.

BRIEF DESCRIPTION OF THE DRAWINGS

Embodiments will now be described by way of example only with reference to the appended drawings wherein.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

It has been recognized that vehicle traversal through an intersection implies many constraints on the vehicle's apparent motion through video images (e.g., from either or both live or recorded video). For this reason, the general detection and tracking approach is unnecessarily complex, while simpler counting based on detection lines can be too simple to be accurate in the presence of mutual occlusions and stop and go motion. These observations also apply generally to the tracking of any object, particularly using video-based tracking methods. The aforementioned approaches to detection and tracking have been found to not exploit the predictable motion constraints of vehicles or other objects traversing an intersection or other observed area, and also do not address real-time computational requirements.

The following describes a system and method to enable a systematic multi-scale process of embedding point sensor measurements of vehicle flow at known, possibly sparse, points in traffic space on a spatio-temporal flow map which is combined with machine learning and mathematical modelling, in order to make complete dense traffic flow estimates, predictions, and traffic visualizations. It can be appreciated that while the following examples may refer to video and image based applications, for example, in detecting and tracking vehicle movement through a scene, the principles described herein equally apply to the movement of any object (e.g., pedestrians, shoppers, animals, etc.) using any available location or position information (e.g., GPS coordinates, beacons, etc.). Wth respect to video, it can be appreciated that the video used can extend to a plurality of spectral bands selected to better detect objects of interest, e.g. infrared or thermal bands. It can also be appreciated that the video data can be processed to enhance a source video for more prominence. Also, multiple camera registrations can be used to improve data collection and spatial and synchronization issues using flow as a salient feature.

In principle, measuring the flow of material at location-specific points combined with mathematical analysis can provide a means for calculating flow throughout a known space. Furthermore, continual measurement and modelling can be used for predicting future flow. What makes this approach particularly feasible in the case of traffic measurement and estimation is the constraints imposed on the motions of vehicles on a road network, reducing the dimensionality of relevant flow measurements and solutions to estimation and prediction problems.

What is more is that low dimensional spatio-temporal embeddings of vehicle flow measurements can therefore be a very efficient multi-scale method for storing historical measurements, performing online real-time updating, and querying and integrating historical data for machine learning and model learning. One small embedding for storing and analyzing motion estimates at various known points in a single video image at a local scale, may naturally be combined with point specific measurements of vehicle motion in an adjacent video, or indeed from wide area location aware measurements such as GPS, radar, and camera networks throughout an entire traffic network. The combined embedding of all these various noisy sensor measurements can represent noisy point estimates of vehicle flow through a wide traffic network, particularly a road network equipped with many registered cameras and sensors. At each scale the same flow model may be learned and applied, i.e. vehicle flow modelling within one video image is the same modelling and estimation used to integrate the flow information from sensor measurements over a wide section of a traffic network.

Given detections and measurements of vehicle appearances and motion in a scene with the constrained expected location and motion like an intersection, these detections and measurements can be exploited in a statistical framework. For example, a hybrid approach of temporal object tracking, and local space time segmentation and sampling can be implemented, wherein short reliable tracked motions are embedded in a reduced parameter space over time as a vehicle flux map—described more fully below.

The flux map allows statistical estimation to be used to obtain a total vehicle volume without having to explicitly stitch track pieces together into a perfect complete track. An advantage is that evidence for vehicle tracks are properly registered for estimation so that small isolated false positives are smoothed away by the short term tracking and statistical estimation, while strong evidence which is reinforced by expected vehicle motion is quickly incorporated. Small track evidence which is consistent with the motion model but may be separated in space and time is correctly incorporated on the map without having to identify each piece as coming from the same vehicle. Incoming video can be processed with image based object detectors (image segmentation and sliding window object detectors), temporal segmentation (background subtraction) and positional and velocity measurements can be made possible from simple naive short term trackers.

These reliable motion measurements can then be embedded in a 2-dimensional parametric space-time map. If vehicles are undergoing stop and go motion, some time elapses with vehicles giving velocity measurements of zero, but the vehicle eventually resumes motion along the lane and the evidence for its motion is combined in the vehicle flux calculation. Even vehicles which are occluded show evidence of their motion before and after the occlusion, and some image and short term tracking reasoning can register information about the vehicle motion during short occlusions. The registered motion evidence can be combined in many ways. It can form a vector field of vector velocities in the vehicle-flux map. Simple vector integration (equivalent to a mean estimation along an infinite number of Virtual Detection Lines) is one approach. Integration can extended to convolution with an arbitrary kernel (representing sampling weight on various portions of the video volume). Still yet other statistical summaries of the flux map such as median, mode, and confidence intervals can give estimates of vehicle volume and uncertainty.

The system described herein can be used to aid in accurately estimating total vehicle volume flow through road traffic infrastructure captured in a single video image. Points of visible road in a video may be analyzed to make measurements in terms of vehicle motion and flow. Further flow analysis and constrained vehicle motion provide a method for accurate online real-time estimation of total flow for reconstructing dense flow. If all flow is efficiently stored and analyzed in a spatio-temporal embedding, then machine learning may be employed to increase accuracy of estimation and prediction models, as well as to classify vehicle types and traffic events based on flow profiles.

Small segments of roadway may be processed in this way, and by scaling, the principle can be used in progressively wider area spaces. Spatio-temporal embeddings of a small segment can be combined with other spatio-temporal flow embeddings from adjacent segments to estimate flow through entire turning movements captured in one camera, or wider maneuvers such as roundabout navigation captured on several co-located cameras.

Figure 1:
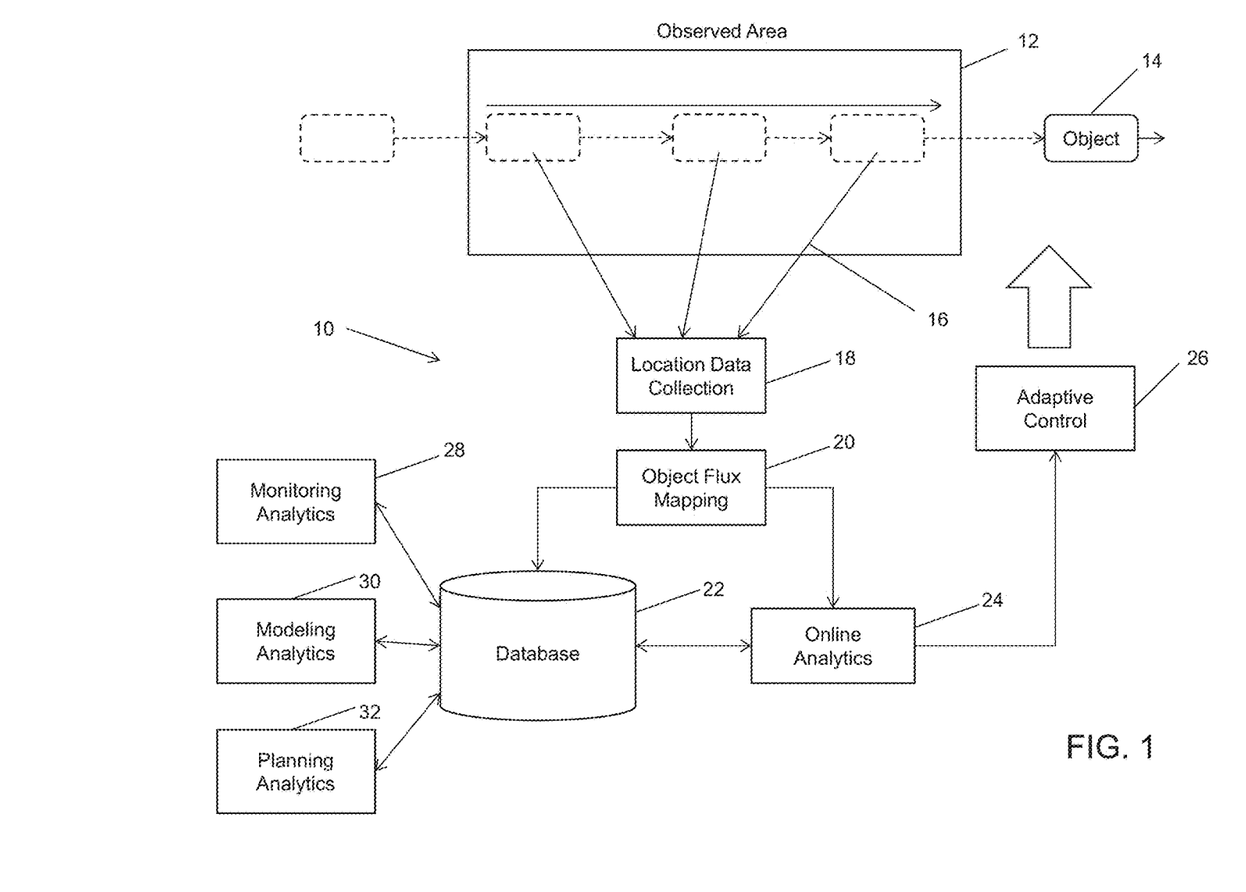
FIG. 1 is a schematic illustration of a system for detecting and tracking objects in an observed area and performing subsequent analytics.

Turning to FIG. 1, a system for detecting and tracking objects, denoted by 10 is shown. The system 10 operates to detect and track objects 14 moving into, within, and perhaps through an observed area 12 as illustrated in FIG. 1. The observed area 12 can be any location or zone, region, etc., such as a traffic intersection or roadway as is used in the examples provided herein. Positional updates 16 associated with the object 14 are provided by a suitable location or positional tracking sub-system such as GPS, video, images, or other sensors. A location data collection module 18 is shown in FIG. 1, which is configured to collect the positional updates 16 for various objects 14. For example, the positional updates can be extracted from a traffic video, or collected from a GPS-enabled device, egocentric video-based localization, etc. The location data collection module 18 provides the location data to an object flux mapping module 20, which is configured to map the movements of the object 14, particularly in and through the observed area 12.

Wth a generated flux map, various applications and processes can be benefited. For example, as shown in FIG. 1, online analytics 24 can be performed in order to conduct adaptive control 26 of the observed area 12 or a wider network of such areas (e.g., a traffic network). The flux mappings for various objects 14 and observed areas 12 can also be stored in a database 22 for subsequent processing. For example, as shown in FIG. 1, monitoring analytics 28, modeling analytics 30, and planning analytics 32 can be performed for longer term applications, updates, improvements, intelligence, etc. The monitoring analytics 28 can include any algorithm or process that is configured to use the flux mappings for monitoring a traffic network. The modeling analytics 30 can include any algorithm or process that is configured to use the flux mappings for modeling the traffic network based on the observed traffic. The planning analytics 32 can be any algorithm or process that is configured to use the flux mappings for traffic or roadway planning.

In the case of a traffic video implementation, it can be appreciated that a larger scale connected network of sensors at known points can provide spatio-temporal traffic flow maps with many applications (e.g., for monitoring live traffic flow to validate live signal monitoring or live impact of signal timing changes, monitoring to automatically adjust data collection or video surveillance bandwidth based on density of object flow, etc.). If the sensors are connected online and live real-time updates are provided, the spatio-temporal embedding may incorporate live updates. Online updates, and learned models may be employed to provide live visualizations and user feedback on the traffic network queried and analyzed from the spatio-temporal embedding. The feedback may be visualized for traffic monitoring or control, or processed for automatic live traffic control. As well as online updates, the flow map may be stored and analyzed to build and improve models for accurate traffic prediction, learning classification schemes of vehicle and traffic properties, or for detecting specific normal or abnormal traffic events including vehicles entering a wrong way on a one-way roadway, collisions and accidents, traffic jam detection, vehicle spacing measurements, or detecting anomalies and interruptions.

Figure 2:
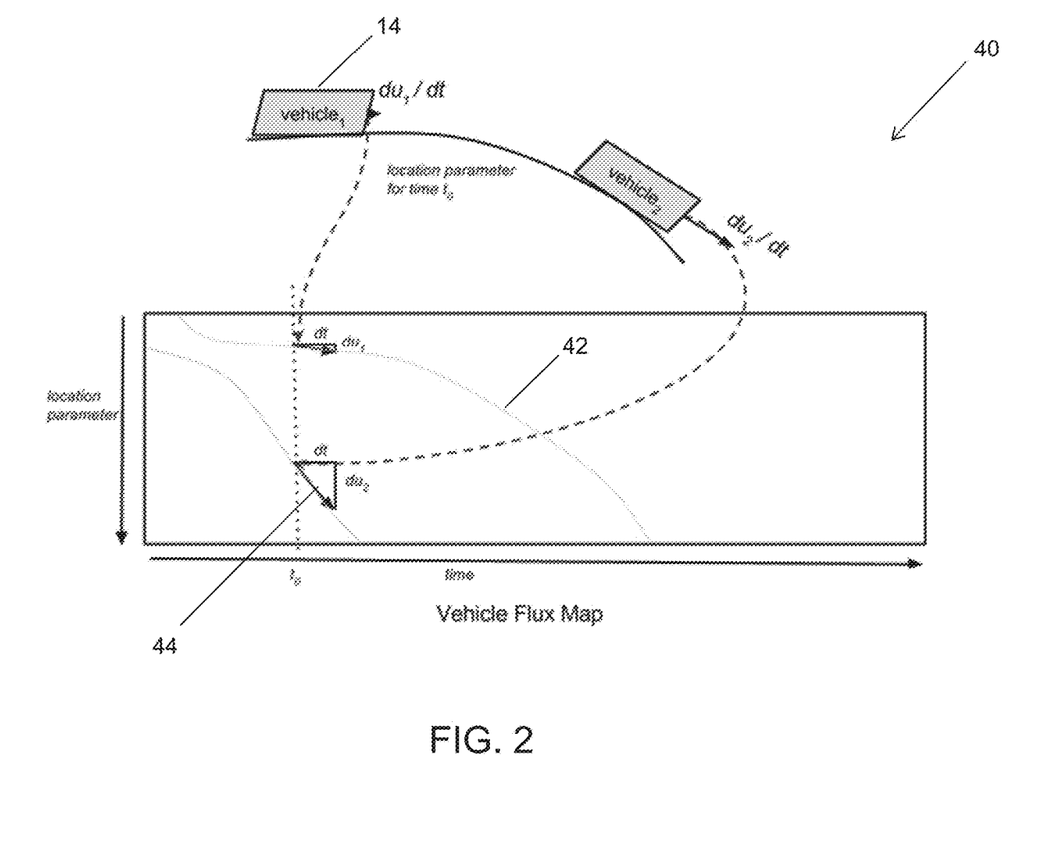
FIG. 2 is a chart illustrating an example of a flux map.

Referring now to FIG. 2, the system described herein can be used to count vehicles using measurements registered on a vehicle flux map 40. This counting process involves reducing a vehicle location to a single temporally evolving location parameter denoted u. The vehicle flux map is a vector field with inputs over two dimensions: time t and the location parameter u. Each point in the map contains a vehicle flow measurement, e.g., the speed at which a vehicle (if present) whose location is given by the parameter that is moving. This can be very sparse with zero vectors for all location parameters with no vehicle present at the given time. The vectors, as they move over time, generate a path 42 for a vehicle, e.g., as it moves through an intersection. It can be appreciated that the location parameter u can be estimated for velocities for each of the objects being tracked at a given time, or these velocities can be measured, e.g., using a position sensor. In one example, unique object presence and spatial occupancy can be obtained through vector field intersections. In this context, a unique object indicates that the object is unique compared to other objects that may be sensed in the scene. The vector field in the flux map 40 can also be extended to include metadata, such as vehicle identifiers.

The vehicle flux map can be constructed as follows:

Initially the vehicle flux map V(u, t) is a vector field over all parameter values u in [0, L] and t in [$t_i$, $t_f$]. All vector values are initially set to zero. The variable "L" is the length of the vector field. For vehicle measurements, L can be used to represent the distance from where the system begins tracking the vehicle to the end of that tracking process. While the value may be zeroed as a datum, it can be appreciated that any point can be used as the datum.

A video is pre-processed or processed online to detect vehicle appearances and give a complete set of measurements of vehicle locations u through all times t in the video as well as velocity measurements designated by the vector value (du, dt)=(du/dt, 1) dt. Vehicle presence and location can be obtained by a detection system, while local velocity can be obtained by suitable image flow measurement or from a short term vehicle tracker.

Each velocity vector measurement is then registered on a parameter-time vehicle flux map. For example, a vehicle with location given by parameter $u_0$ at time $t_o$ with measured parametric velocity v=du/dt implies that a value may be assigned to the vehicle flux map V($u_0$, $t_0$)=(v*dt, dt).

Some post-processing such as convolutional operators, smoothing and pattern recognition can be performed directly on the Vehicle Flux map 40 to eliminate measurements due to noise and clutter. In particular spurious isolated vehicle/velocity measurements can be suppressed. Measurements obtained by confusers such as vehicles in adjacent lanes may be detected and eliminated especially if they have negative velocities traveling counter to the expected vehicle flow.

FIG. 2 provides an example with two vehicles 14 ($vehicle_1$ and $vehicle_2$) traversing a track (e.g. roadway or intersection) at time $t_0$. The vehicles' locations are given by the parameters $u_1$ and $u_2$ respectively. The instantaneous velocities are $du_1$/dt and $du_2$/dt. Also shown is the vehicle flux map 40 with lines tracing the paths 42 of the vehicles 14 as they traverse the scene over time. The slice of time being observed ($t_0$) is denoted using the dashed vertical line in FIG. 2. The enlarged views of the vehicles demonstrate the different velocities of each vehicle being assigned to vectors in the vehicle flux map 40 vector field. Both vectors 44 originate at time $t_0$, and both have a component, dt in the time direction. The components in the u parameter direction are proportional to their velocity.

Total vehicle volumes then can be obtained from the vehicle flux map 40 using various vector calculus and statistical techniques. In particular, integration of the vector field normal to the direction of travel gives the total vehicle flow quantity which is equivalent to the statistical technique of measuring total flow through each point along the track and taking the mean. Mode, median, confidence interval estimation and many other statistical techniques may also be employed to obtain vehicle count estimates.

Figure 3:
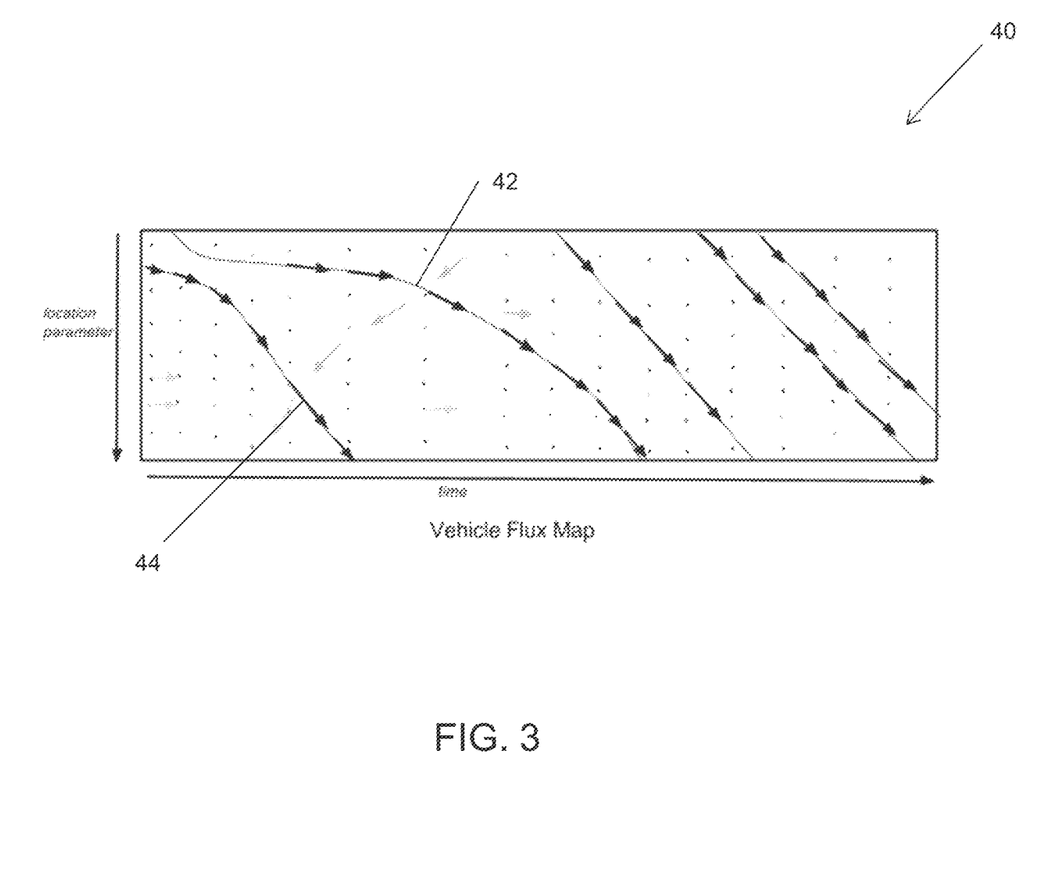
FIG. 3 is a chart illustrating an example of a flux map showing movement of a series of objects over time.

FIG. 3 provides an example of a complete vector field in a vehicle flux map 40. In this example, five vehicles 14 are shown traversing the scene. The true vehicle paths 42 are traced out through the vectors 44. It can be observed from this vector field that the first two vehicles 14 (counting left to right) decelerate and accelerate through the scene (e.g., through a turn). The remaining three vehicles 14 pass through an a substantially constant velocity (e.g., passing through an intersection). Various greyed out vectors can be seen, which represent vectors that have been suppressed by post processing. For example, some may be false positive measurements, others may represent a vehicle 14 in a different lane traversing the reverse direction. Some velocity measurements of the second vehicle are missed, however, the path 42 can be extrapolated as shown.

Figure 4:
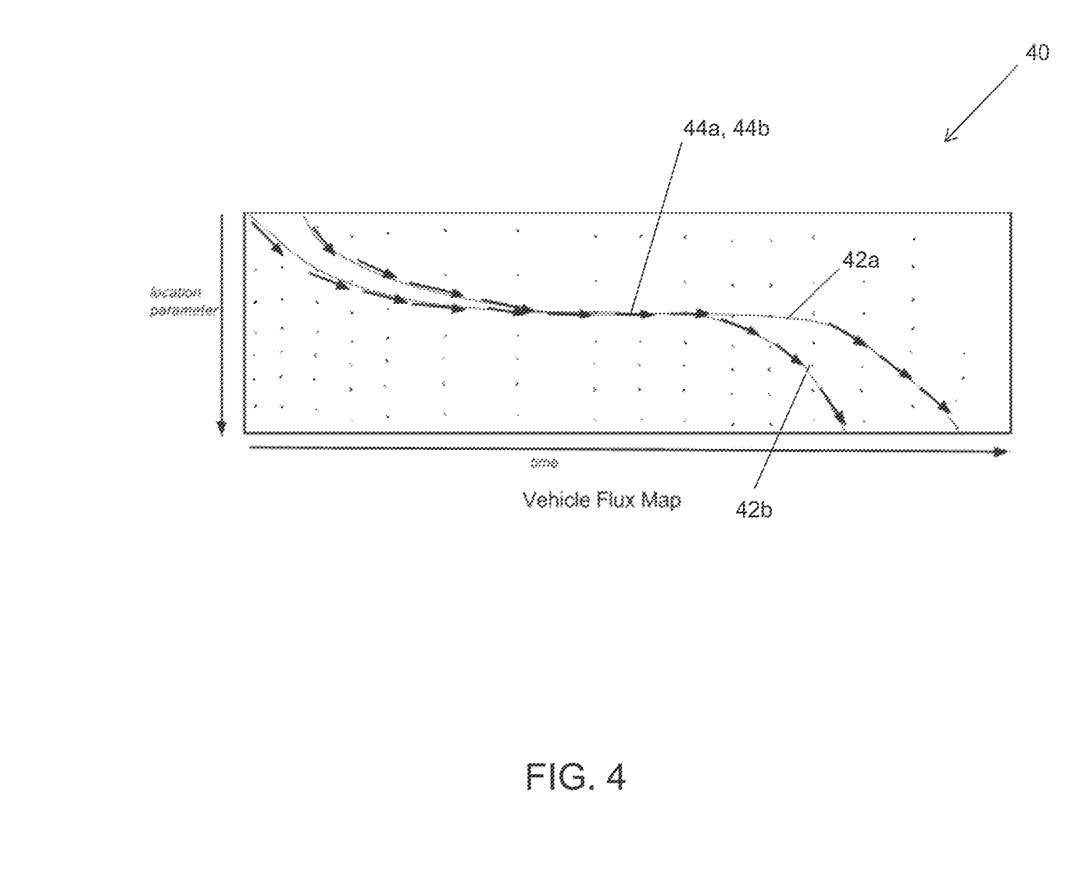
FIG. 4 is a chart illustrating an example of a flux map showing movement of a pair of objects in which one occludes the other during such movement.

FIG. 4 provides an example of a vehicle flux map 40 generated for a pair of vehicles that stop at an intersection and wherein one vehicle occludes the other temporarily. In FIG. 4, vehicle path 42a is for the first vehicle and the vehicle path 42b is for the second vehicle. The individual vehicle paths 42a, 42b are traced out along the vectors 44a, 44b, which shows that the first vehicle decelerates and stops before the second vehicle, but when both vehicles are stopped, the second vehicle is occluded behind the first vehicle. As time progresses, the first vehicle begins moving again and exits the scene, while the second vehicle accelerates shortly thereafter. It may be noted that this is a common scenario for vehicles stopping at the entrance of an intersection, which is difficult for a multiple target tracker in previous systems to count, unless the second vehicle is re-identified when it reappears. While the velocity measurements for the second vehicle disappear during the occlusion when both vehicles are stopped, they are distinct when either vehicle is moving and, importantly, the total flow from the velocity measurements still represents the flow for two vehicles, by showing the overall flow in the scene, for the vehicles (i.e. looking at the vehicle paths 42a, 42b when traced out).

Figure 5:
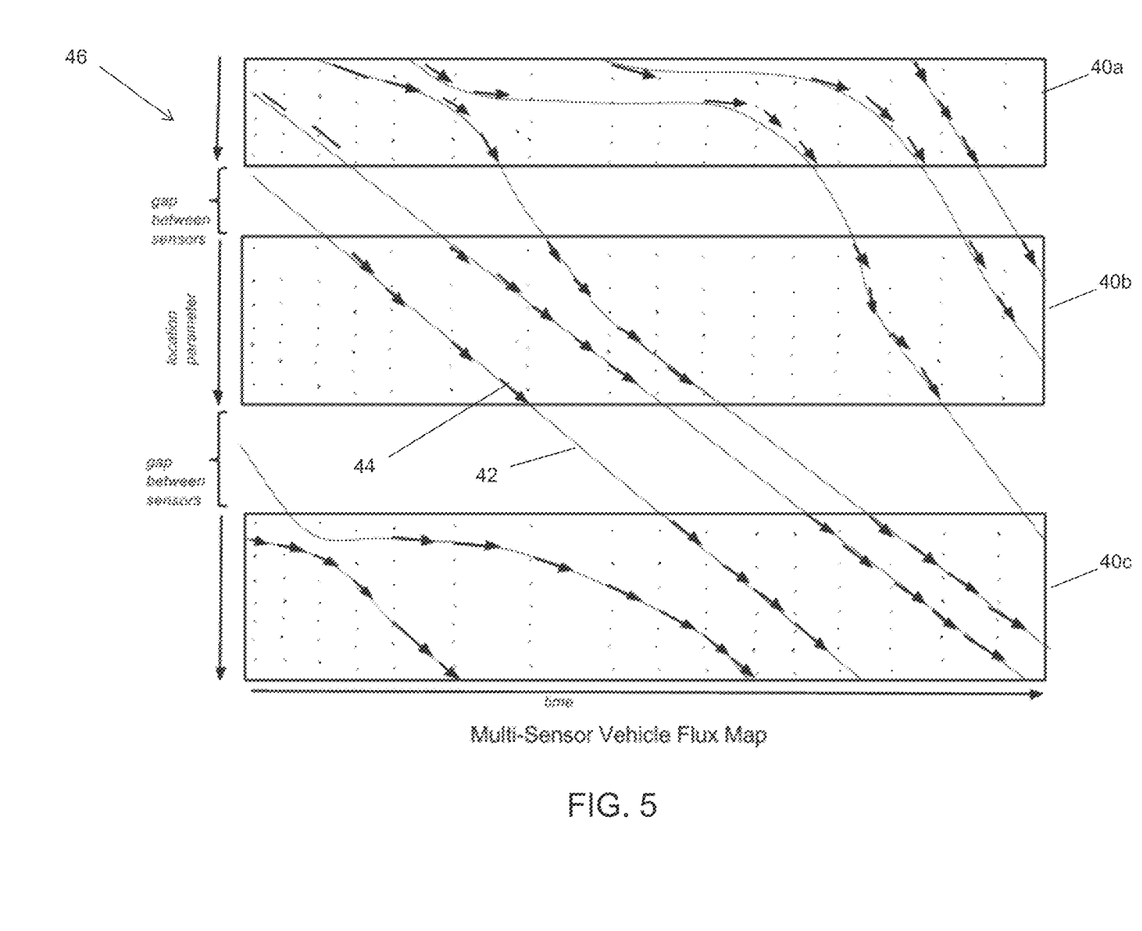
FIG. 5 is a chart illustrating an example of a multi-sensor flux map aggregated by three successive sensors to interpolate object paths.

Turning now to FIG. 5, an example of a multi-sensor vehicle flux map 46 is shown, which is an aggregation or augmentation of three flux maps 40a, 40b, 40c with corresponding vector fields, generated from three successive sensors along a path in a traffic network. The true vehicle paths 42 are traced out through the vectors 44 and extend from map to map. The vectors 44 represent measured and stored vehicle flux observations. It may be noted that while there are no flux observations in the gaps between sensors, the paths 42 can be interpolated as shown in FIG. 5.

Figure 6:
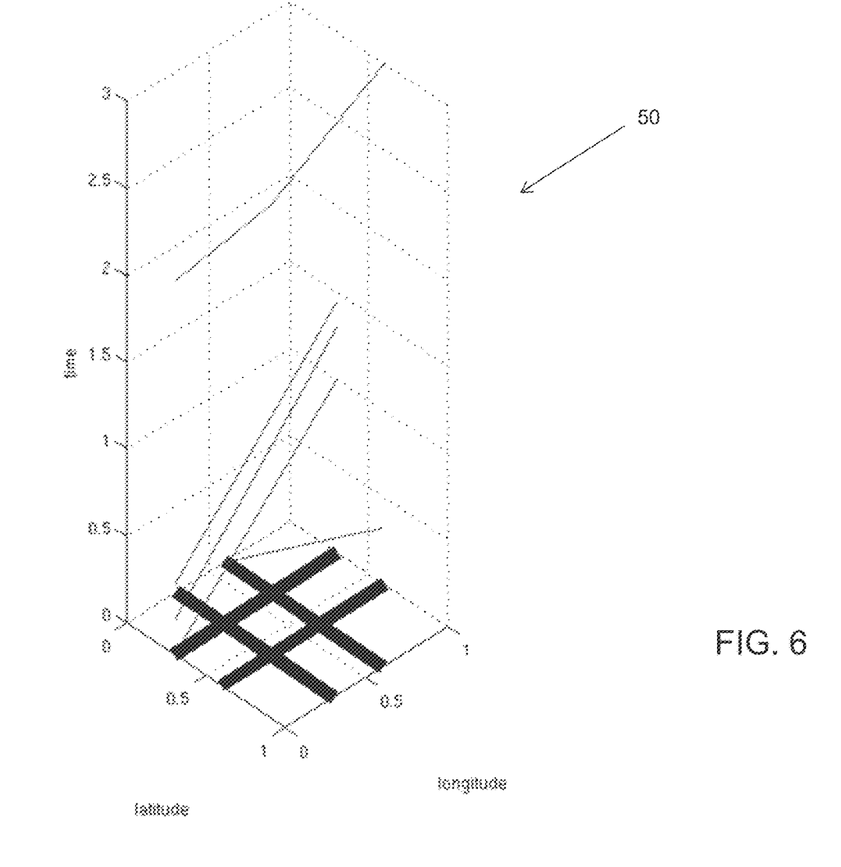
FIG. 6 is a three-dimensional illustration showing movement of a series of objects over time through a traffic grid.

FIG. 6 illustrates a 3D flux map 50. The floor of the 3D flux map represents the spatial location and the height of the map represents passage of time. This map can be generated in several ways. One way is to simply have a collection of vehicle sensors, each with a specified longitude and latitude or more abstractly an x location and y location. Each binary sensor can indicate the presence of a vehicle at a specified time and location within the map. An alternative method can produce the same type of map from a collection of 2D maps. In this case, each 2D map may represent some common direction, such as position along a roadway. Each 2D map would have spatial position in the "x" direction and temporal data along its height. The 3D flux map can be created by aligning several of these 2D maps next to each other in the "y" direction, possibly one for each lane and/or possibly (with more detail) 10 detectors per each lane. The resulting volume represents spatial data on the floor of the map (along the roadway and through adjacent lanes) and temporal data along the height.

The 3D map allows an entire city grid to be analyzed. Heavy traffic flows through corridors can be identified and queried. One use case is that the user can see how traffic diverges throughout the city when an accident occurs, and how the signals on each alternative route can be better tuned or dynamically responsive. Further, since the city grid is now part of the map, partial measurements in parts of the city can be propagated to traffic flow estimates in other parts of the city, either due to historic data at that location or traffic models given the configuration of connected roadways. This creates a mechanism for traffic reports to be generated from any amount of partial positional and/or velocity data.

While FIG. 6 represents a small section of roadway, the map can be generalized from a single roadway or intersection to an entire city, state/province, or national network. As the scale increases, the floor of the 3D map should begin to align with a map of the region as data is collected. The spatial part of the flux map 40 corresponds to a traditional roadmap allowing vehicle flow over time to visualize as vehicles drive around curves or meander through city networks. The 3D flux map can also extend to a 4D flux map containing x, y, and z spatial information in addition to time if 3D positioning, e.g. aerial vehicles or submersible vehicles, are being measured.

A 4D flux map could be used in much the same way as the 3D map. For example, having flow estimates within a human blood stream and a connected pathway model in x, y, and z, partial flow estimates at various points in the body can be represented in a 4D map to incorporate metabolic changes throughout the day.

Figure 7:
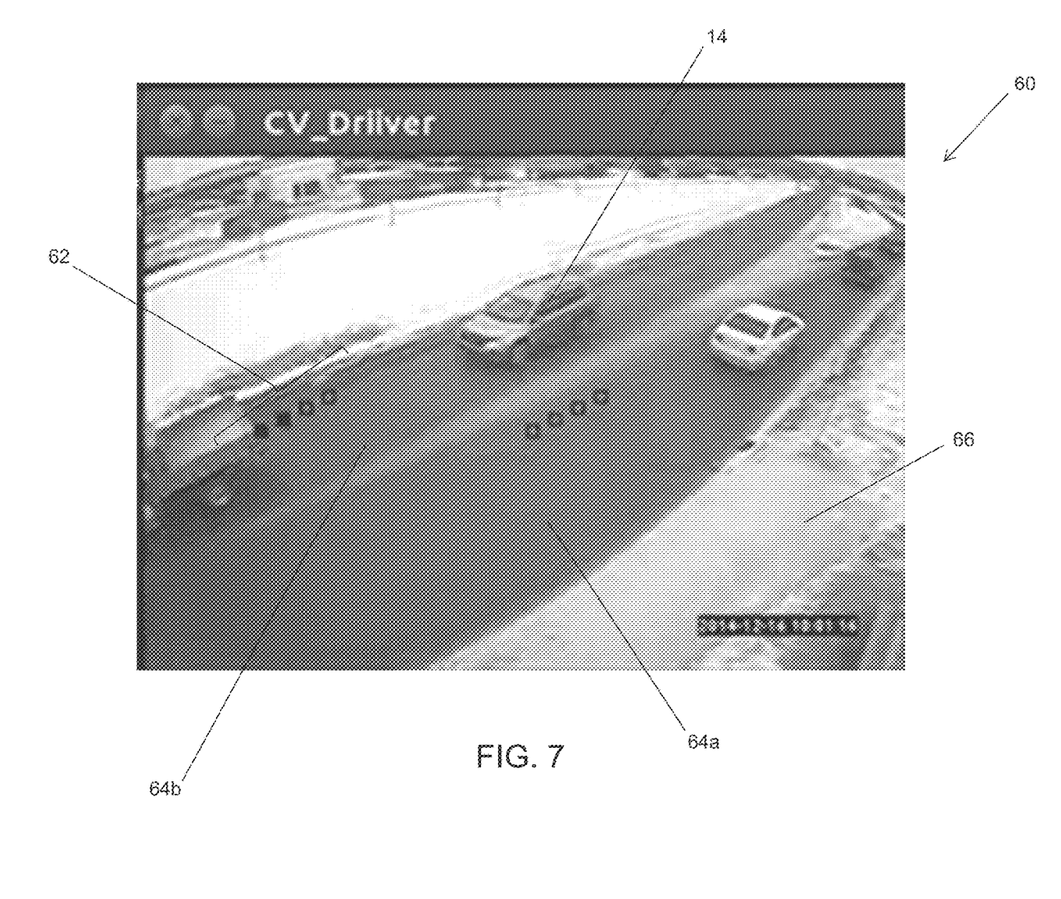
FIG. 7 is a screenshot of a video having virtual detectors for detecting and tracking vehicles in a scene.

In order to measure and store vehicle flux observations, in one implementation, virtual detectors 62 can be created in video data 60 as shown in FIG. 7. The detectors are spaced along the roadway paths (i.e. one set of detectors 62 along one lane of traffic 64a, and another set of detectors 62 along the opposing lane of traffic 64b). Since the lanes of traffic 64 are predictable, the background 66 of the video image can be disregarded in this study. As a vehicle 14 passes through the scene captured by the video 60, the detectors 62 should successively detect the vehicle 14 and record location data points at corresponding times, that can be used to generate a vehicle flux map 40 for the scene.

Figure 8:
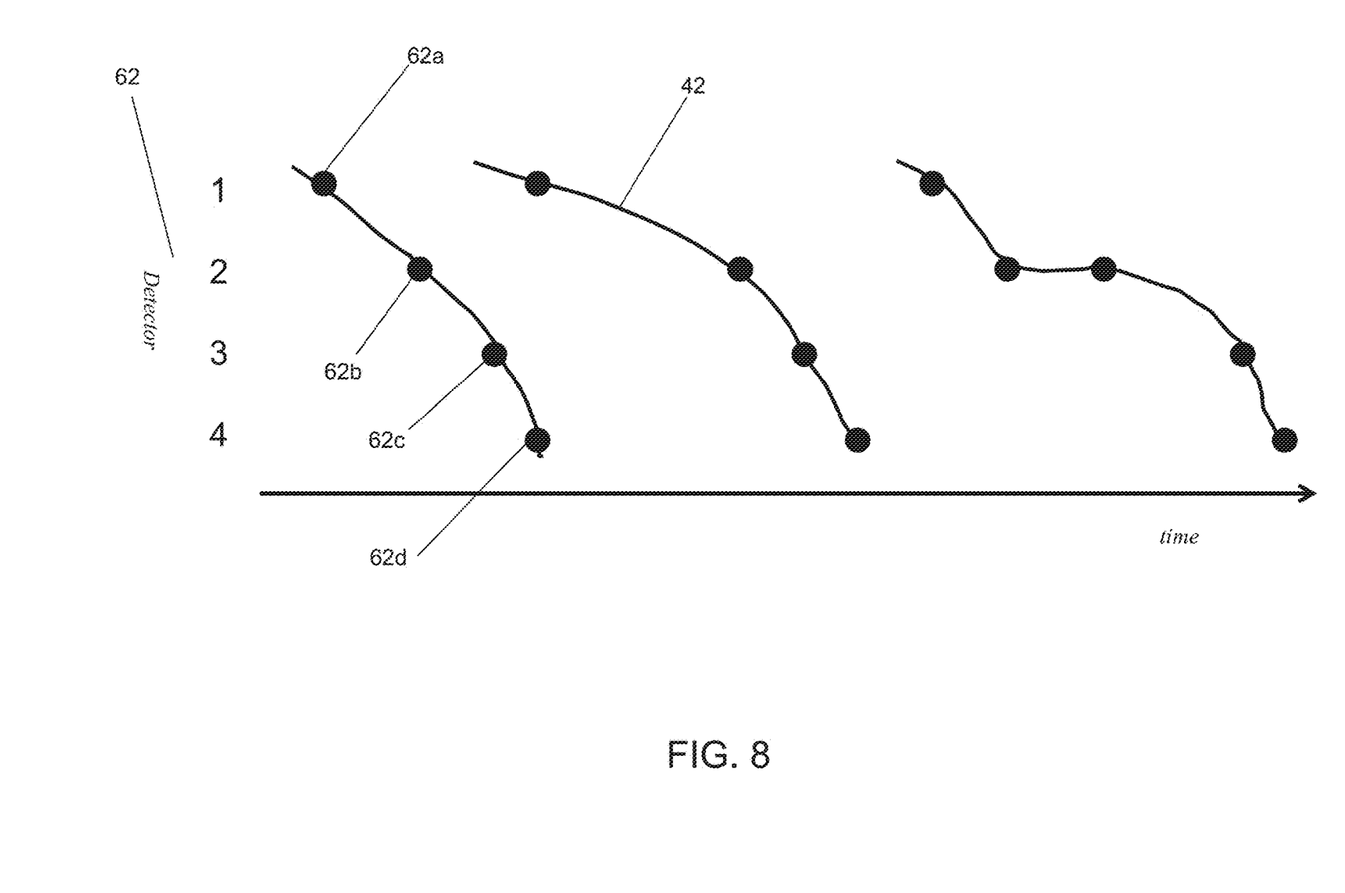
FIG. 8 is a pictorial illustration of a series of objects detected moving through a scene using a set of virtual detectors.

FIG. 8 illustrates a mapping of the detectors 62 in FIG. 7 for three vehicles, which shows the different paths 42 taken by each vehicle. For example, the first vehicle traveled through the roadway in the shortest amount of time while a second vehicle entered as the first vehicle was leaving, and it can be observed that the second vehicle took more time travelling between the first two detection points. The third vehicle is detected by the second detector for a period of time, thus indicating that the third vehicle has stopped, pulled over, or significantly slowed down whereas the other two vehicles proceed more fluidly through the detectors. The velocity of traffic flow can be readily calculated from the vector field. Further a horizontal line extending through the graph yields three vehicles, regardless of where the line is drawn. Occlusion robust vehicle counts can be estimated by averaging the number of paths that intersect a horizontal line for each of the detector points 62a, 62b, 62c, and 62d. For example, if a vehicle detector was applied to a video frame where one vehicle is occluded behind another, the occluded vehicle would not be detected, and consequently not counted. This possibility can occur if the vehicle detector is looking only at a single position over all time or if the vehicle detector is looking at the entire video frame at a single time. If, instead, the vehicle detector tried to look at the entire video frame over all time, the same vehicle would be detected many times. The vehicle flux mapping provides a robust way to represent all vehicles in all spatial positions at all time. Thus through aggregation methods, the vehicle counts can be obtained.

Figure 9:
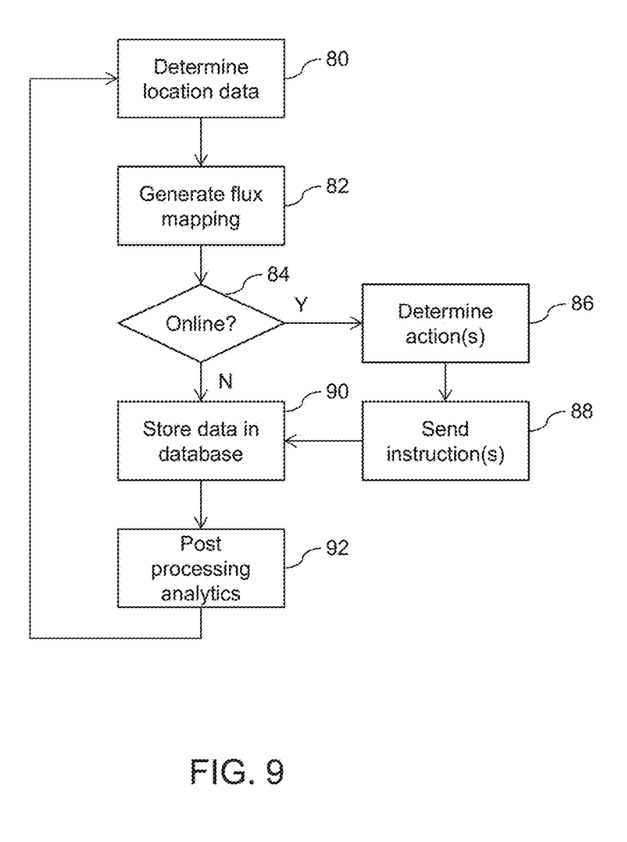
FIG. 9 is a flowchart illustrating computer executable instructions that may be performed in detecting and tracking objects in an observed area for subsequent processing.

FIG. 9 is a flowchart illustrating computer executable operations performed in generating and utilizing a flux map 40. At 80 the location data collection module 18 determines location data that is used by the object flux mapping module 20 to generate a flux map 40 at 82. The system 10 may then determine at 84 whether or not the flux map 40 is to be used in online analytics at 84. If so, actions to be performed based on the online analytics are determined at 86 and one or more instructions are sent to, for example, an adaptive control system 26 at 88. The vehicle flux data is then saved in the database 22 at 90 and post processing analytics (e.g., as illustrated in FIG. 1) can be performed at 92.

Figure 10:
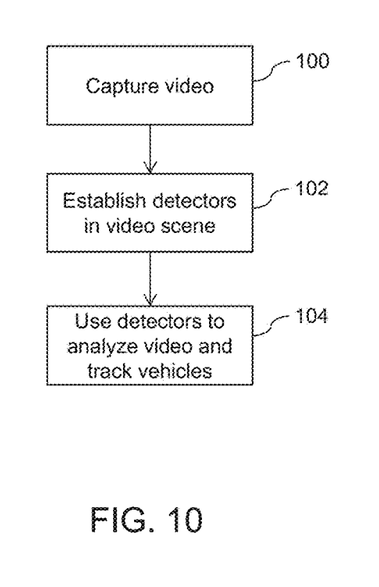
FIG. 10 is a flowchart illustrating computer executable instructions that may be performed in using virtual detectors in a video to track movement of vehicles through a scene.

FIG. 10 illustrates an example implementation for determining location data for tracking vehicles using video data 60. At 100 a video of a scene is captured and detectors 62 are established in the video scene, e.g., as shown in FIG. 8. The detectors 62 are then used to analyze the video and track vehicles 14 as they pass through the detectors 62, which have been positioned along a predictable path within the scene in this example.

The vehicle flux map 40 (or any object flux map detecting and tracking object movements) can be used for various applications utilizing vehicle tracking data.

For example, the flux map 40 and the data associated therewith can be scaled to monitor, analyze, or control: 1) an intersection; 2) a roadway/corridor; 3) a roadway network; and 4) intra-city, inter-city/region, state-wide. Temporally, the vehicle flux maps 40 can be used for processing current, past, and future events. The vehicle flux maps 40 can be used in, for example: 1) Density and Flow Monitoring (DM), 2) Simulation Model Generation (SMG), 3) Adaptive signal control (ASC), and 4) Self-consistency (SC)

The following Table 1 illustrates a number of applications for using vehicle flux mapping.

TABLE 1

Example Applications

| Scale | Use | Past | Current | Future |
|---|---|---|---|---|
| Intersection | DM | (a) Traffic density versus signal timing reports (b) Event recall with signal timings (c) Vehicle counting - roundabouts, intersections, paths | (a) Signal monitoring (b) Traffic event detection (c) Estimate occlusions from multiple cameras (d) Infer traffic signal status from flux map | |
| | SMG | (a) Intersection flow optimization study | (a) Real-time impact of signal adjustments | |
| | ASC | (a) Timing pattern training (b) Train vehicle classifier based on acceleration | (a) Vehicle detection per lane (b) Vehicle classification | (a) Predictive timings based on live patterns |
| | SC | | (a) Multiple camera registration | |
| Roadway | DM | (a) Peak/Typical artery volume reports | (a) Corridor monitoring (b) Traffic jam detection (c) Adaptive bandwidth for surveillance based on upcoming density (d) Estimate traffic density on unmeasured regions from nearby measurements (e) Estimate vehicle spacing from flux map | |

TABLE 1-continued

Example Applications

| Scale | Use | Past | Current (Temporal) | Future |
|---|---|---|---|---|
| | SMG | | | |
| | ASC | (a) Timing pattern training | (a) Adaptive corridor timings (b) Convey detection and signal adaptation (c) More accurate vehicle detection using density from upstream | |
| | SC | | (a) Density validation through conservation of mass through path | |
| Network | DM | (a) Peak/Typical volume reports (b) Origin to destination reports from density (vehicle id can be stored in the flux map) (c) Easily query density along paths on network in space and time | (a) Region monitoring (visualize over/under performing areas of the network) (b) Irregular traffic detection (c) Adaptive bandwidth for surveillance based on upcoming density (d) Estimate traffic density on unmeasured regions from nearby measurements | (a) Trip planning |
| | SMG | (a) Historical traffic studies and with proposed modifications | (a) Real-time simulation models to see immediate impact of signal changes | (a) Future traffic given historic trends (b) Determine fewest monitoring station locations in network to achieve a given model accuracy |
| | ASC | (a) Timing pattern training | (a) More accurate vehicle detection using density from upstream | (a) Suggested future signal patterns |
| | SC | | (a) More accurate density validation through conservation of mass | |
| Large network | DM | | (a) Inter-city flow monitoring | |
| | SMG | | | |
| | ASC | | | |

Table 1 categorizes applications of this flux map into past, present, and future. The data collected and stored in the flux map can be dissected by allowing queries, such as number of vehicles turning at intersection A, to be evaluated as hyperplane intersections. The horizontal line used for counting in FIG. 8. becomes a plane in three-dimensions. Paths that intersect that plane indicate the presence of vehicles over all time, or a range or period of time. Analysis for vehicle flow during different times of day and at or through various locations can be readily extracted from geometric queries. The traffic analyst can quickly access stats on lane departure and lane changes as vehicles drive from one lane to another over time, vehicle following distance, overall flow through traffic corridors, historical under/over utilized roadways, and a rich data set from which to train traffic signals and classifiers based on acceleration profiles.

Analysis of live data through a vehicle flux map 40 provides real-time status of a region. The traffic engineer can quickly query for traffic jams or lane blockages through manual or automatic detection of flow changes. Traffic signal controls can be adapted based on vehicle flow, extended periods for slower moving traffic, shorter periods where there are gaps. With the anticipation of vehicles driving towards a corridor, traffic surveillance can be throttled to provide more bandwidth as higher fast moving traffic enters a region and lower bandwidth as traffic density decreases or vehicles slow down. Combining a vehicle flux map 40 with a simulation, provides real-time simulation of the current traffic state allowing engineers to quickly test out new timings, evaluate their effect on the traffic, and implement the successful traffic reducing timing plans. The traffic model can even provide traffic flow estimates on unmeasured regions using the measurements from the flow map as prior knowledge and a model to fill in the gaps. For instance. The gaps illustrated in FIG. 5. can be estimated based on nearby sensor measurements and a model; a linear model in this example.

The future predictive capabilities of an easily accessible historic flow map can allow queries to determine maximum flow of traffic or determine which intersections have the worst historic performance. Using the flow map to fill in missing measurements, better data collection planning can occur by providing stats on which areas of a traffic network have redundant amounts of measurements and which areas are under-represented. Given a limited supply of measurement equipment, vehicle flux can help put it to use to measure optimal network coverage. The historic data can also be fed into a simulator for future planning purposes to estimate the effect of new buildings, infrastructure, and signal times on traffic flow, querying the best and worst cases. The flow maps can also provide better stable planning for trip routing or deliver routing by providing both historic traffic trends, recent traffic trends, and incorporating live data to help predict the state of traffic when the driver arrives.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, which may be read and executed by at least one processor to perform the operations described herein. A computer readable media may include any non-transitory memory mechanism for storing information in a form readable by a machine (e.g., a computer). Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the system 10, any component of or related to the system 10, etc., or accessible or connectable thereto. Any application or module herein described may be implemented using computer readable/executable instructions that may be stored or otherwise held by such computer readable media.

The steps or operations in the flowcharts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of mapping movement of objects through a known space, the method comprising:
    determining a location parameter for each of a plurality of objects at a plurality of points in time and corresponding locations in the known space, the known space comprising a network of motion constrained pathways for the objects;
    generating a vector field over location and time across the known space using the location parameters, to specify, for each object, motion of that object through the known space over time;
    generating a motion path for each object using velocities from the vector field for that object, as the object moves through the known space over time; and
    outputting a mapping of the motion paths for the plurality of objects over the known space.

2. The method of claim 1, further comprising:
    estimating a location parameter for velocities for each of a plurality of objects at a given time; or
    incorporating measured velocity parameters into location parameters for each of the plurality of objects.

3. The method of claim 1, wherein unique object presence and spatial occupancy are obtained through vector field intersections.

4. The method of claim 1, further comprising removing at least one measurement associated with noise, clutter, or a spurious measurement.

5. The method of claim 1, wherein the location parameter is determined using at least one image sensor applied to an image or video.

6. The method of claim 1, wherein the location parameter is determined using a position sensor.

7. The method of claim 6, wherein the position sensor corresponds to an egocentric video-based localization.

8. The method of claim 1, further comprising:
    generating at least one additional mapping of the motion paths in at least one additional vector field for the known space, or augmentation to at least one existing field, associated with at least one additional corresponding location in the known space; and outputting at least one additional mapping.

9. The method of claim 8, further comprising interpolating the motion paths between locations to account for gaps between location sensors.

10. The method of claim 1, wherein the location parameter comprises two dimensions, and the mapping is a three dimensional vector field.

11. The method of claim 1, further comprising obtaining a video capturing at least one image of a scene in the known space, and determining the location parameter using the video.

12. The method of claim 11, wherein multiple videos, live or recorded, are used to map a larger spatial location.

13. The method of claim 11, wherein the video extends to a plurality of spectral bands selected to better detect objects of interest.

14. The method of claim 1, further comprising utilizing multiple camera registrations to improve data collection spatial and temporal synchronization issues using flow as a salient feature.

15. The method of claim 1, wherein the location parameter of a single object at a given time is determined using an object passing through a gate with a known position, the location parameter corresponding to the known position being incorporated into the vector field.

16. The method of claim 1, wherein at least one of the objects is a vehicle.

17. The method of claim 1, wherein the known space comprises at least one scene each scene comprising at least one constraint to motion of the objects through that scene.

18. The method of claim 17, wherein at least one constraint corresponds to a roadway and at least one of the objects corresponds to a vehicle.

19. The method of claim 1, further comprising analyzing the mapping of the motion paths, and using an output of the analyzing to perform at least one adaptive control operation.

20. The method of claim 19, wherein the adaptive control operation is applied to the known space or another known space in a traffic network.

21. The method of claim 1, further comprising storing the mapping for subsequent monitoring.

22. The method of claim 21, further comprising at least one of monitoring and reporting on normal traffic events or abnormal traffic events, wherein normal or abnormal traffic events comprise any one or more of: vehicles entering a wrong way on a one-way roadway, collisions, traffic jam detection, and vehicle spacing measurements.

23. The method of claim 21, further comprising monitoring to automatically adjust data collection or video surveillance bandwidth based on density of object flow.

24. The method of claim 1, further comprising storing the mapping and performing at least one monitoring operation associated with the known space.

25. The method of claim 1, further comprising measuring locations of one or more objects in one, two, or three dimensions over time.

26. The method of claim 25, wherein three dimensional location measurements are obtained for aerial or submersible vehicles.

27. A non-transitory computer readable medium comprising computer executable instructions for mapping movement of objects through a known space, comprising instructions for:
 determining a location parameter for each of a plurality of objects at a plurality of points in time and corresponding locations in the known space, the known space comprising a network of motion constrained pathways for the objects;
 generating a vector field over location and time across the known space using the location parameters, to specify, for each object, motion of that object through the known space over time;
 generating a motion path for each object using velocities from the vector field for that object, as the object moves through the known space over time; and
 outputting a mapping of the motion paths for the plurality of objects over the known space.

28. A system comprising a processor and memory, the memory comprising computer executable instructions for mapping movement of objects through a known space, comprising instructions for:
 determining a location parameter for each of a plurality of objects at a plurality of points in time and corresponding locations in the known space, the known space comprising a network of motion constrained pathways for the objects;
 generating a vector field over location and time across the known space using the location parameters, to specify, for each object, motion of that object through the known space over time;
 generating a motion path for each object using velocities from the vector field for that object, as the object moves through the known space over time; and
 outputting a mapping of the motion paths for the plurality of objects over the known space.

* * * * *